United States Patent
Kuegle

(10) Patent No.: US 10,168,713 B2
(45) Date of Patent: *Jan. 1, 2019

(54) TRANSPORT VEHICLE AND METHOD FOR A PROBLEM-FREE TRANSPORT OF HEAVY-DUTY SHELVES IN WORKSHOPS WITH RADIO SHADOWING USING A PARTLY AUTONOMOUS DRIVE MODE

(71) Applicant: Grenzebach Maschinenbau GmbH, Asbach-Baeumenheim (DE)

(72) Inventor: Bernhard Kuegle, Mering (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 15 days.

This patent is subject to a terminal disclaimer.

(21) Appl. No.: 15/022,787

(22) PCT Filed: Aug. 29, 2014

(86) PCT No.: PCT/DE2014/000455
§ 371 (c)(1),
(2) Date: Mar. 17, 2016

(87) PCT Pub. No.: WO2015/043563
PCT Pub. Date: Apr. 2, 2015

(65) Prior Publication Data
US 2016/0209847 A1   Jul. 21, 2016

(30) Foreign Application Priority Data

Sep. 30, 2013   (DE) .................. 10 2013 016 381

(51) Int. Cl.
*G05D 1/02*   (2006.01)
*B60P 1/02*   (2006.01)
(Continued)

(52) U.S. Cl.
CPC .............. *G05D 1/0276* (2013.01); *B60P 1/02* (2013.01); *B66F 9/063* (2013.01); *B66F 9/065* (2013.01);
(Continued)

(58) Field of Classification Search
CPC ....... G05D 1/0276; G05D 1/0291; B60P 1/02; B60P 1/022; B66F 9/063; B66F 9/065; B66F 9/0755; B66F 9/07586
See application file for complete search history.

(56) References Cited

U.S. PATENT DOCUMENTS

| | | | |
|---|---|---|---|
| 5,280,431 A | 1/1994 | Summerville et al. | |
| 6,390,213 B1 | 5/2002 | Bleicher | |
| 2007/0208476 A1* | 9/2007 | Baginski | B66F 9/0755 701/50 |

(Continued)

FOREIGN PATENT DOCUMENTS

WO   2013023721   2/2013

OTHER PUBLICATIONS

Ullrich, G., "Fahrerlose Transportsysteme" Wiesbaden: Vieweg + Teubner Verlag, 1 Auflage 2011—ISBN 978-38348-0791-5, with English translation of relevant portion of this reference, as cited in the German Office Action, dated Aug. 24, 2014, of the priority application which is German Patent Application No. 10 2013 016 381.1.

*Primary Examiner* — Jerrah Edwards
*Assistant Examiner* — Mathew Franklin Gordon
(74) *Attorney, Agent, or Firm* — Duane Morris LLP; J. Rodman Steele, Jr.; Gregory M. Lefkowitz

(57) ABSTRACT

The invention relates to a transport vehicle and a method for a problem-free transport of heavy-duty shelves in workshops with radio shadowing using a partly autonomous drive mode, having the following features: a) a vehicle housing with a support plate for receiving and transporting a heavy-
(Continued)

duty shelf, comprising two drive wheels which are driven separately on both sides in the center of the vehicle housing on a respective separately mounted rotational axle, b) a transverse link which connects the drive wheels, each drive wheel being pivotal about the rotational axle via an angle lever, such that the drive wheels can carry out vertical movements independently of each other, c) a centrally arranged actuating element which can move two front lift rods and two rear lift rods via a lift rotary lever and via a push rod which is connected to the lift rotary lever in order to lift or lower the support plate, d) a system for supplying energy to the transport vehicle, and e) at least one 3D scanner, at least one light field sensor, and at least one WLAN antenna in the front region of the vehicle body.

8 Claims, 7 Drawing Sheets

(51) Int. Cl.
*B66F 9/065* (2006.01)
*B66F 9/06* (2006.01)
*B66F 9/075* (2006.01)

(52) U.S. Cl.
CPC ........ *B66F 9/0755* (2013.01); *B66F 9/07586* (2013.01); *G05D 1/0291* (2013.01)

(56) References Cited

U.S. PATENT DOCUMENTS

| | | |
|---|---|---|
| 2010/0078232 A1 | 4/2010 | Adachi |
| 2011/0128412 A1 | 6/2011 | Milnes et al. |
| 2012/0197439 A1 | 8/2012 | Wang et al. |
| 2013/0177379 A1 | 7/2013 | Hoffman et al. |

* cited by examiner

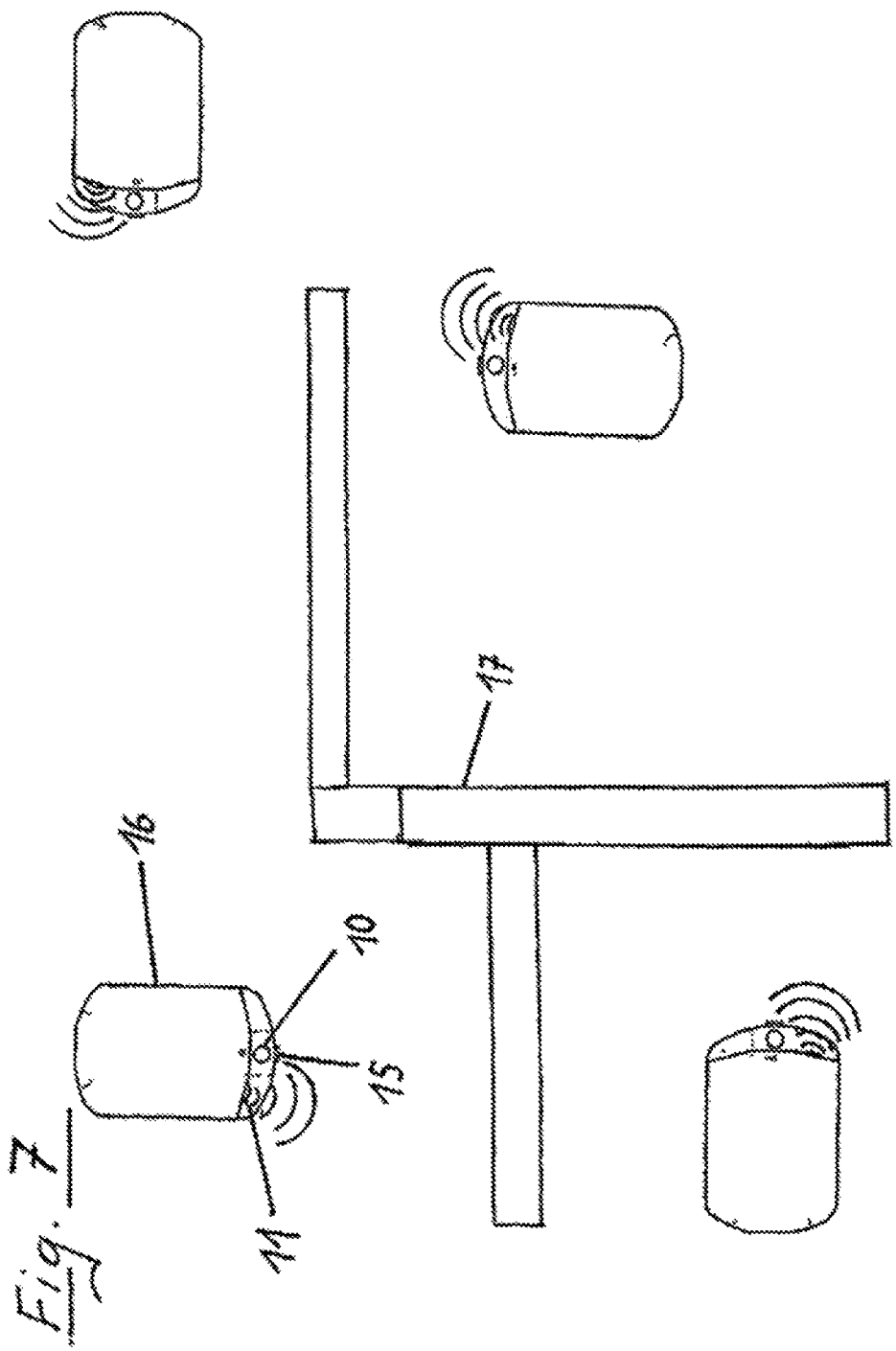

TRANSPORT VEHICLE AND METHOD FOR A PROBLEM-FREE TRANSPORT OF HEAVY-DUTY SHELVES IN WORKSHOPS WITH RADIO SHADOWING USING A PARTLY AUTONOMOUS DRIVE MODE

CROSS-REFERENCE TO RELATED APPLICATIONS

This application is a § 371 national stage entry of International Application No. PCT/DE2014/000455, filed Aug. 29, 2014, which claims priority to German Patent Application No. 10 2013 016 381.1, filed Sep. 30, 2013, the entire contents of which are incorporated herein by reference.

The present invention relates to a transport vehicle and to a method for transporting storage shelves by partially autonomous operation and without interference in factory buildings having deadspots.

In a multiplicity of corporate sectors, for example in foodstuffs and domestic goods or industrial and domestic products trading, goods are present in homogenous original pallets having identical containers in storage shelves. A container here may be a packed or non-packed unit load, or an assembly of goods such as a box, a carton, or a crate having bulk material or a plurality of individually packed goods such as beverage bottles or dairy produce.

In order for a shipment to a specific customer to be assembled, packs having variable items or containers have to be assembled.

Collecting individual component parts of such a shipment in this case may be performed by hand or by means of automatically guided vehicles. Such so-called AGVs (automatically guided vehicles) may be mobile robots or vehicles specially constructed for the respective application, which by a special guiding and controlling method are moved from one place to another. Traditional automatically guided vehicles by way of which materials are moved in factories and warehouses, for example, have minimum point-to-point movement control. Most such systems use AGVs which follow a fixed guide track. This here is generally a high-frequency transmission antenna wire which is disposed so as to be sunk into the factory floor, a reflective strip which is painted onto the floor, or a reflective tape which is adhesively bonded onto the floor. However, such guide tracks are obviously very prone to damage and unreliable.

All these movement controls limit the freedom of movement of the individual AGVs in that the latter are forced to follow a physically established path.

Most such systems depend on vehicle-specific proximity detection in order to avoid collisions with other vehicles, static objects, or human personnel. In such systems, the AGVs can only move longitudinally in one direction along the lane the former are pursuing.

Such systems achieve point-to-point movement by implementing control schematics and using freely movable AGVs having programmable bi-directional paths. On account thereof, it is achieved that a plurality of AGVs are located on the same paths simultaneously without any collisions or excessive jams.

These methods maximize the degree of freedom of movement of the AGVs. The control schematics here implement a schematic of "static" collision avoidance for AGV systems. Here, a computer program for examining the respective environment of an AGV is substantially used in order to determine only such paths that are usable by AGVs. A further allocation program extracts therefrom the required data in order for AGVs to be moved from one point to another in the respective system, without two AGVs simultaneously using the same path.

The disadvantages of these methods of the prior art lie in that the latter are limited to either closed routes, to unidirectional movement, to the absence of external control of the AGV movement, or to "static" collision avoidance.

In order for these disadvantages to be avoided, DE 689 28 565 T2, according to the details of patent claim 1, discloses a method for directing a plurality of automatically guided vehicles (AGV) along a network of interconnected paths which commence at intersections, end at intersections, and contain intersections.

In this method, a record of a route to be followed by the specific AGVs in the form of path sections which commence at an intersection and end at the next intersection is established.

Furthermore, an indication of the position of a specific AGV is established. Furthermore an indication of whether the intersection is free or occupied is derived for each intersection.

Furthermore, a list of intersections which contains the intersection just visited by the specific AGV by at least a few intersections along the recorded route, which will be visited by the specific AGV, is generated for a specific AGV. This is performed including checking that each of the intersections in the list is free prior to being accepted in the list, and marking each intersection in the list as being occupied once said intersection has been accepted in the list. Furthermore, transmitting the list of intersections to the specific AGVs and instigating that said AGV moves longitudinally forward on the recorded route through the intersections is performed.

It is the object of the present invention to provide an autonomous transport vehicle by way of which rapid transporting of storage shelves may be executed in large factory buildings without interference even in the case of a non-planar floor and in the case of slight inclinations. In addition, it is also intended for fault-free communication between a command center and each transport vehicle to be possible, even in the case of deadspots which arise owing to metal walls or shadowing surfaces.

This object is achieved by the device according to

Claim 1. A transport vehicle for transporting storage shelves by partially autonomous operation and without interference in factory buildings having deadspots, the transport vehicle having the following features:
  a) a vehicle housing (3) having a support plate (1) for receiving and transporting a storage shelf (12) having transported goods (13), having two separately driven drive wheels (6) on both sides of one in each case individually mounted rotation axle (5) in the center of the vehicle housing (3), wherein in each case at least one support wheel (9) is provided on the front side and on the rear side of the vehicle housing (9),
  b) a transverse link (25) which connects the drive wheels (6) which are in each case by way of an angular lever (46) pivotable about the rotation axle (5) such that said drive wheels (6) may execute mutually independent vertical movements,
  c) a centrally disposed control member (20) which by way of a lift-and-rotate lever (33) and by way of a push rod (30) connected to the latter may move two front lifting rods (35) and two rear lifting rods (41) for lifting or lowering the support plate (1),
  d) a system for supplying energy to the transport vehicle either by way of inductive lines installed in the floor, by means of an inductive pickup element (14) or by way of energy supply stations which are for feeding electrical, liquid, or gaseous energy and are accessible when stationary, wherein installation space (28) for corresponding energy storage units is provided in the vehicle housing (3),
- e) at least one 3-D scanner (10) and at least one light-field sensor (15), and at least one WLAN antenna (11) in the front region of the vehicle body (9).

Claim 2. The transport vehicle as claimed in claim 1, characterized in that at least one 3-D scanner (10) and at least one light-field sensor (15) are provided on each side of the transport vehicle, wherein a further WLAN antenna is installed in the rear region of the transport vehicle.

Claim 3. The transport vehicle as claimed in claim 1 or 2, characterized in that for separate height adjustment the front lifting rods (35) in each case have one control member (49), and the rear lifting rods (41) in each case have one control member (42).

Claim 4. The transport vehicle as claimed in one of the preceding claims, characterized in that the center of gravity of the storage shelf (12) is detected by means of sensors, and in that the result of such center-of-gravity determination is used for controlling the control members of the lifting rods (35) and (41).

Claim 5. The transport vehicle as claimed in one of the preceding claims, characterized in that sensors (46) for detecting the rotation movement of the drive wheels (6) are provided, which sensors may also determine slippage on each drive wheel (6) dependent on the speed of the transport vehicle.

and the method according to

Claim 6. A method for operating a transport vehicle for transporting storage shelves by partially autonomous operation and without interference in factory buildings having deadspots, the method having the following features:
- a) a command center in a warehouse region having deadspots receives the order to ensure that a specific storage shelf (12) having transported goods (13) located thereon is to be transported to a specific destination;
- b) the command center determines which transport vehicle, based on the current location thereof and the present order status thereof, is in the position to handle the pending order in the fastest manner;
- c) a specific transport vehicle then receives from the command center the order to seek a specific storage shelf (12) in a specific area of a comparatively large floor space of a warehouse region, to pick up this storage shelf (12), and to drive this storage shelf (1) having the transported goods (13) located thereon to a specific storage space, wherein one or more further transport vehicles are included by means of a WLAN antenna and a corresponding transmission and reception device for the corresponding communication to circumvent deadspots;
- d) the transport vehicle selected by the command center receives from the command center the instructions, which have been determined by means of a specific route algorithm, in terms of the route to be driven and of the speed to be driven in each section of the journey in order for the immediate destination region to be reached in a specific time window;
- e) the relevant transport vehicle by means of the 3-D scanner (10) and of the light-field sensor (15) determines the storage shelf (12) to be picked up, selects a suitable initial position for picking up the storage shelf (12), drives under the latter and lifts up the latter for transport;
- f) the corresponding transport vehicle awaits the instructions from the command center and, according to the received instructions, starts off on the return journey.

Claim 7. The method as claimed in claim 6, characterized in that the loss of the data connection between a transport vehicle and the command center is registered by the other transport vehicles, and another transport vehicle as a mobile WLAN hotspot re-establishes the lost data connection to the command center.

Claim 8. The method as claimed in claim 6 or 7, characterized in that the center of gravity of the storage shelf (12) is detected by means of sensors, and the result of such center-of-gravity determination is used for controlling the control members of the lifting rods (35) and (41), and in that the inclination of a storage shelf (12) is determined by means of an inclination sensor.

Claim 9. The method as claimed in one of claims 6 to 8, characterized in that sensors for detecting the rotation movement of the drive wheels (6) are provided, which sensors may also determine slippage on each drive wheel (6) dependent on the speed of the transport vehicle.

Claim 10. A computer program having a program code for carrying out the method steps as claimed in one of claims 6 to 9, when the program is executed in a computer.

Claim 11. A machine-readable carrier having the program code of a computer program for carrying out the method as claimed in one of claims 6 to 9 when the program is executed in a computer.

respectively.

The device according to the invention will be described hereunder in more detail. In the figures, in detail:

FIG. 7 shows a representation of the hot-spot functions.

Figure 1:
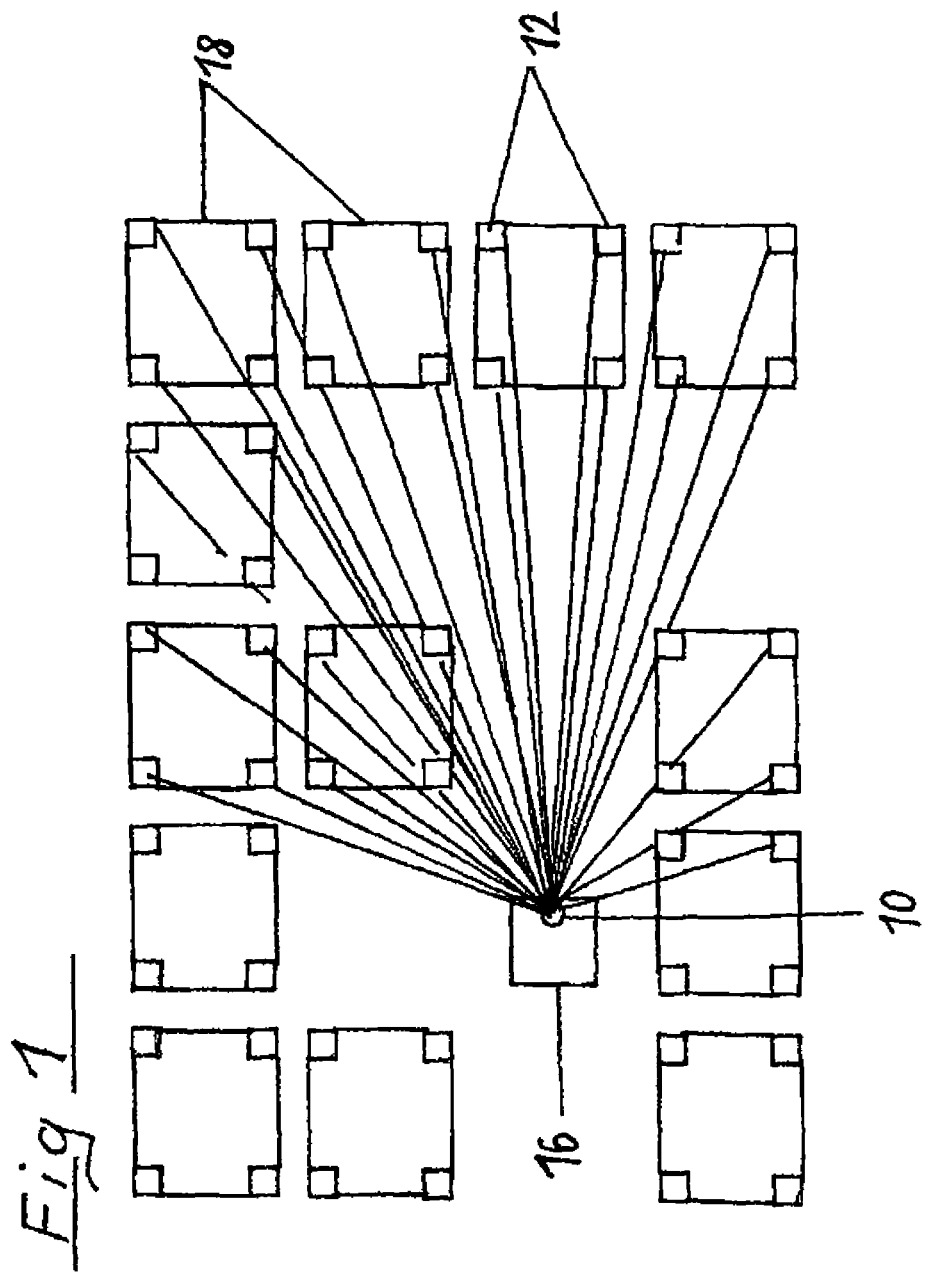
FIG. 1 shows an assembly of storage shelves to be transported.

FIG. 1 shows an assembly of storage shelves to be transported. In this illustration, a few storage shelves 12 which stand on in each case four shelf unit posts 18 are to be seen as a partial detail in the plan view, the exact position of said storage shelves being detected by means of a 3-D scanner, or also referenced as laser scanner 10, by a transport vehicle 16.

Figure 2:
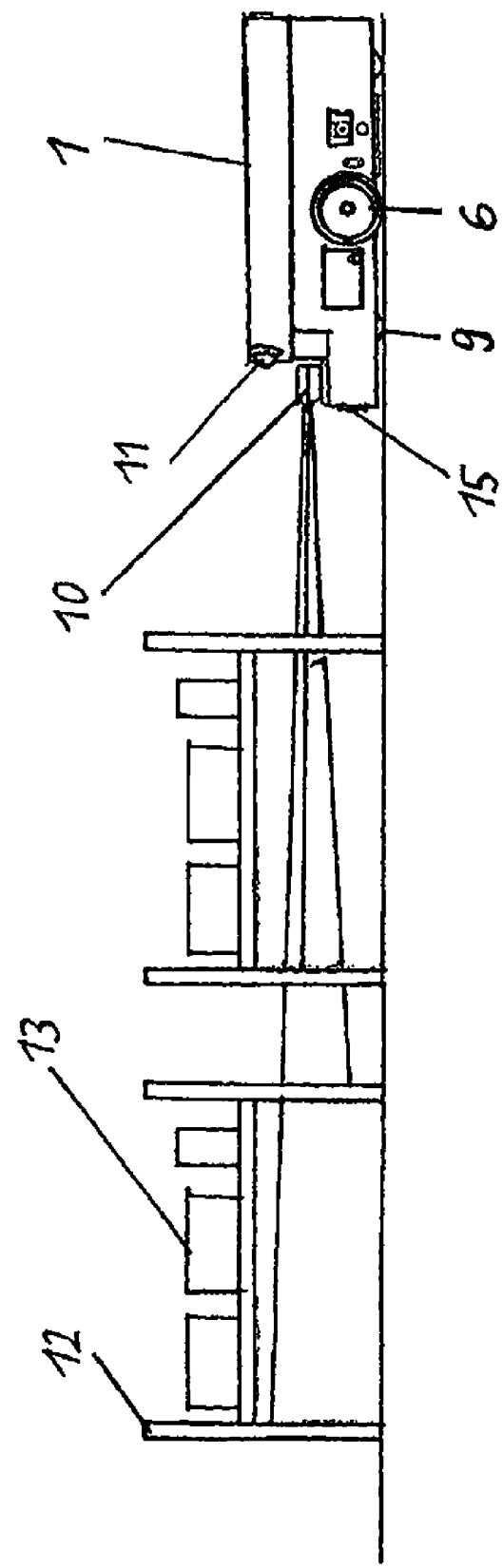
FIG. 2 shows a transport vehicle approaching storage shelves.

FIG. 2 shows a transport vehicle approaching storage shelves 12. Two storage shelves 12 standing behind one another, having shelf unit posts thereof and transported goods 13 thereof bearing thereon, are illustrated in the left region of FIG. 2. A transport vehicle by means of two drive wheels 6 of which only one can be seen in the side view, and by means of a front support wheel 9 approaches these two storage shelves 12. The rear support wheel is not referenced here in more detail. In order for a storage shelf 12 to be received, the transport vehicle has a height-adjustable support plate 1. In order for the environment of a transport vehicle to be detected, each of these vehicles has a 3-D scanner 10 and a light-field sensor 15 at least on the front side. For radio communication with a command center and/or with other transport vehicles, each transport vehicle has at least one WLAN antenna 11 having the associated transmission devices and reception devices.

In terms of the light-field sensor 15 used, reference is made to the new development of the so-called minilenses which in the form of hundreds of minilenses collect optical information according to the light-field principle, which information by data technology may then later be assembled to form images having a desired resolution and/or a desired viewing angle. Such minilenses are 3-D capable, cheap to manufacture, and are based on the principle of an insect eye.

Figure 5:
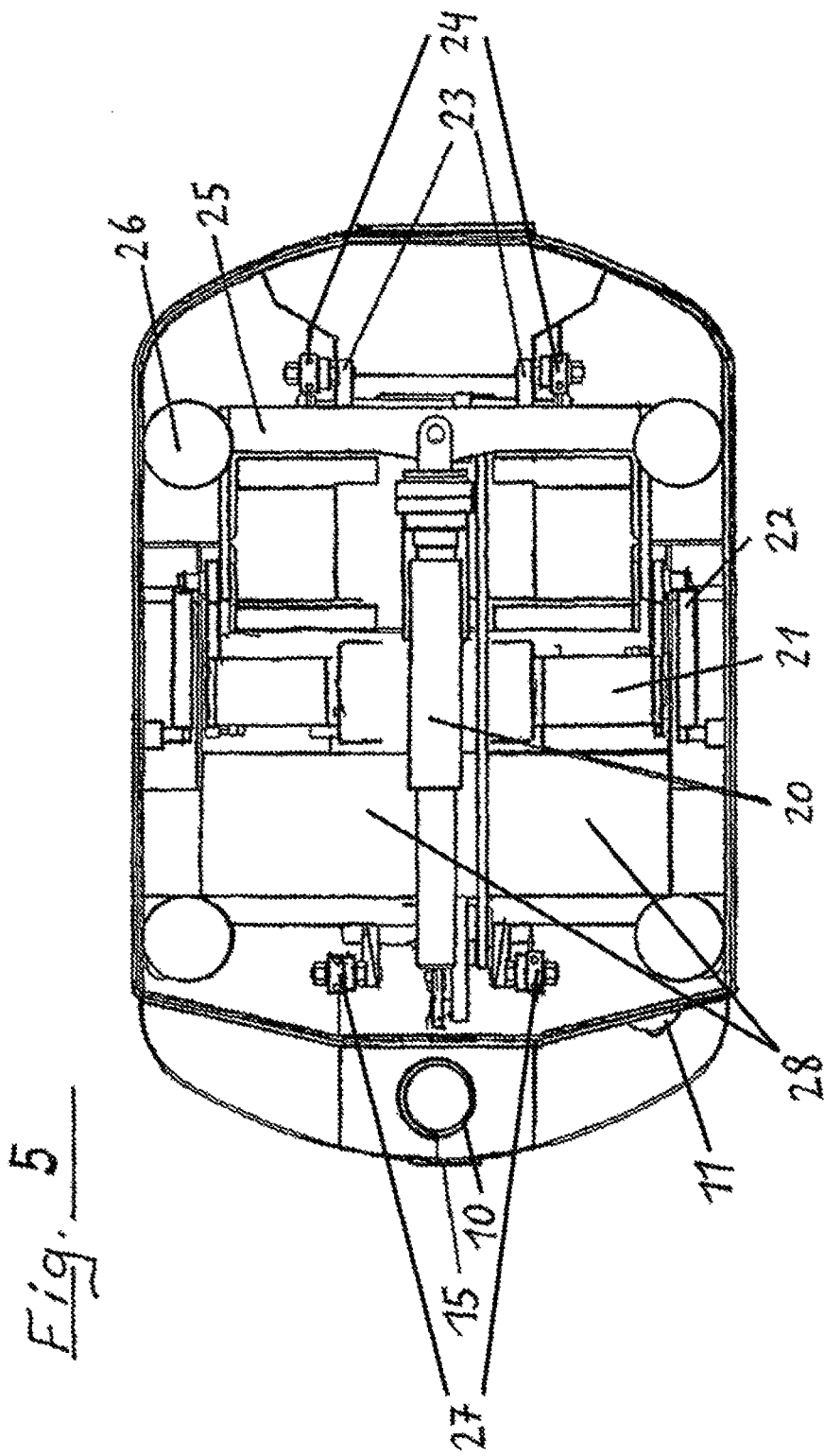
FIG. 5 shows a plan view of the kinematics of a transport vehicle.
Figure 6:
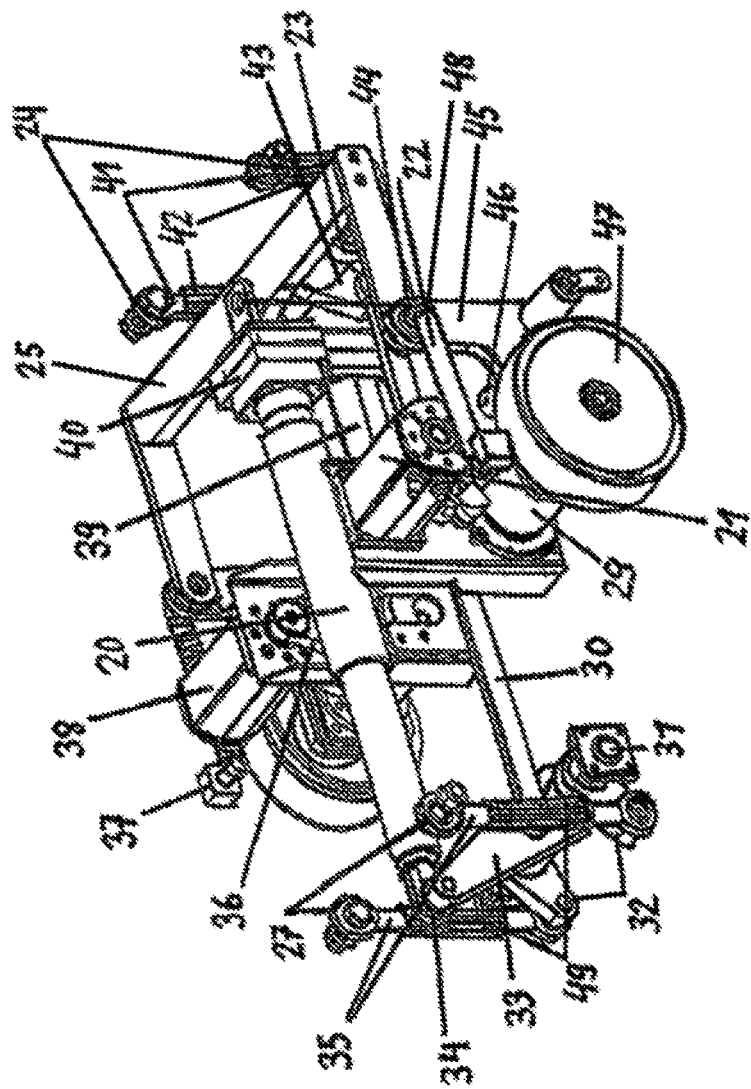
FIG. 6 shows a detailed illustration of the kinematics of a transport vehicle.

A more detailed description of the mechanism for progressive travel and for lifting a storage shelf 1 will be presented in the context of the description of FIG. 5 and FIG. 6.

Figure 3:
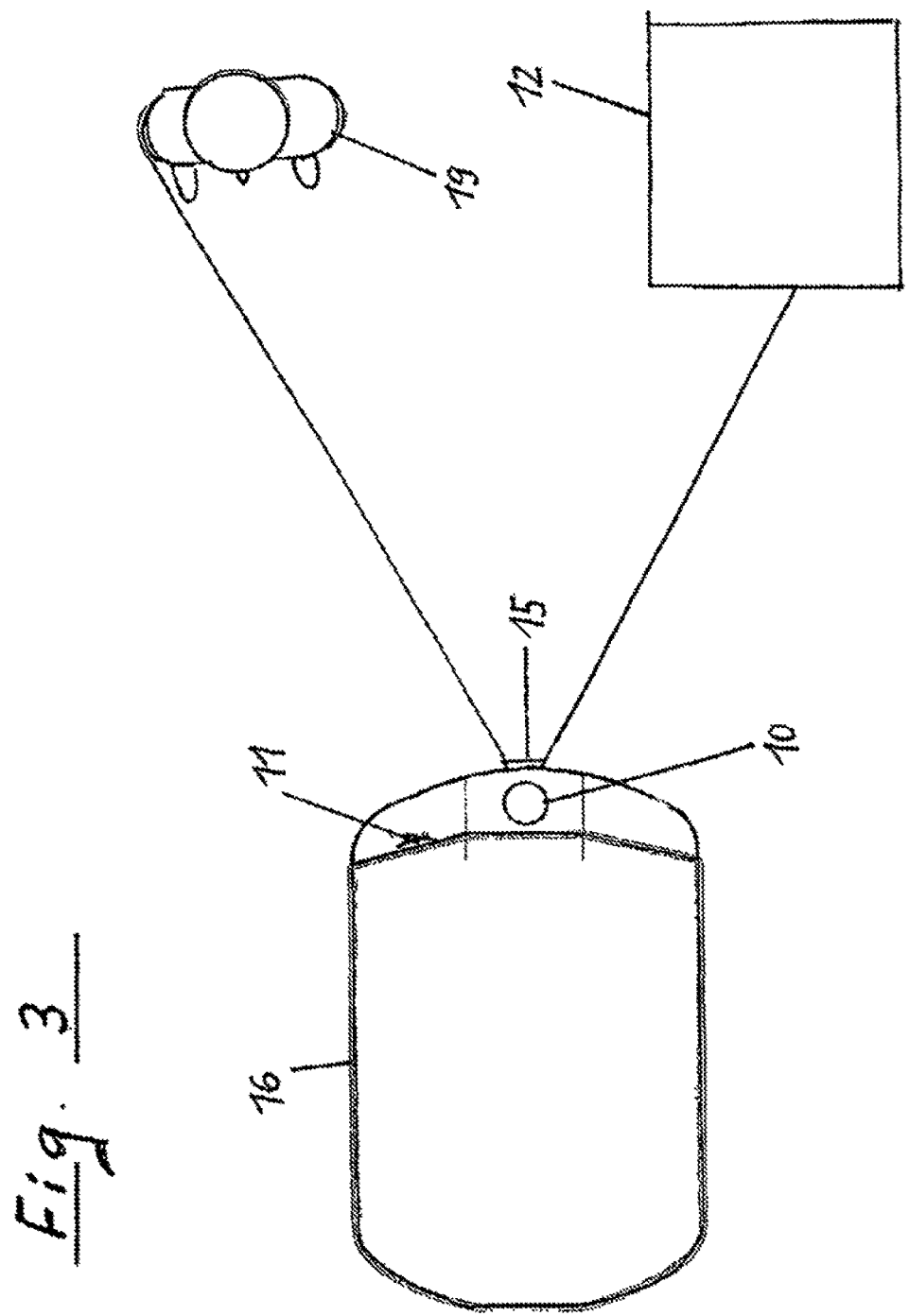
FIG. 3 shows an orientation situation of a transport vehicle.

FIG. 3 shows an orientation situation of a transport vehicle 16, having real obstacles.

This here is a normal storage shelf 12 which may be identified as has been previously described, on the one hand, and is a person 19 who does not really belong in this environment, on the other hand. Such a person 12, representing an unusual obstacle, is identified by a transport vehicle 16 by means of a light-field sensor 15. The 3-D scanner 10 shown supports the position assessment from the view of the transport vehicle 16. A WLAN antenna 11 serves for the communication resulting from the illustrated situation.

The working world traveled by a transport vehicle 16 represents itself to the latter as a collection of shelf unit posts 18. Each shelf unit post 18 on each of the four sides thereof may have a marking in the form of a bar code, which marking identifies said shelf unit post 18 as component part of a specific storage position and renders said shelf unit post 18 identifiable from all sides to a transport vehicle 16, mainly by means of the 3-D scanner 10 of the latter.

Figure 4:
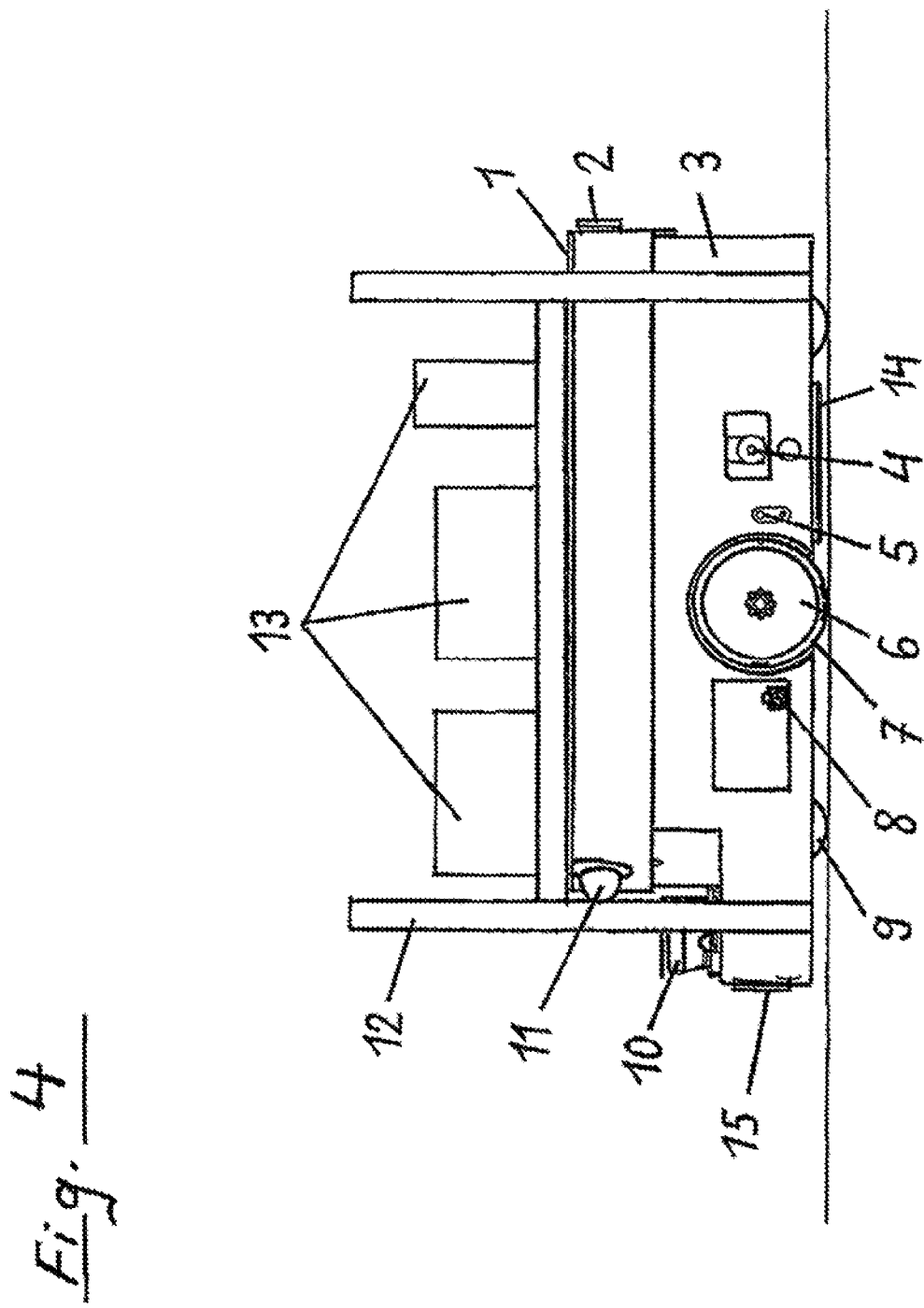
FIG. 4 shows a side view of a loaded transport vehicle.

FIG. 4 shows a side view of a transport vehicle loaded with transported goods 13. The drive wheels, the left one is referenced with 6 here, and the support wheels, the front support wheel is referenced with 9 here, of the latter touch the floor, and the storage shelf 12 bears on the support plate 1 of the transport vehicle. The coating 7 of the left drive wheel 6 may in each case be selected so as to correspond to the floor texture. The rotation axle 5, about which the left drive wheel 6 may move vertically in the main axis, is connected to the housing 3 of the transport vehicle. The charge coupling 8 for connecting an electric charging device can be seen in this side view of FIG. 4. Electric power may likewise be picked up by means of an inductive pick-up element 14 by way of electric lines installed in the floor. Of course, control instructions for each transport vehicle may also be transmitted from a command center by way of such lines. These lines may also serve for mutual communication between transport vehicles, wherein a command center may or may not be involved. In this way, it may be simpler in the case of communication between transport vehicles that are located close to one another in spatial terms for this information path to be selected, very particularly when radio shadowing plays a part. Furthermore, an externally actuatable operating element 4, for example in the form of an emergency stop, is provided on this side. A display 2 having information that is relevant to the operating personnel is attached to the rear side of the transport vehicle shown.

A 3-D scanner 10 and a light-field sensor 15 are installed on the front side of the transport vehicle. The functioning of the WLAN antenna 11 which is likewise installed in this region will be described later in the context of the description of FIG. 7.

FIG. 5 shows a plan view of the kinematics of a transport vehicle.

In this FIG. 5 a control member 20, or a threaded spindle, respectively, can be seen in the longitudinal direction in a central position, which control member in an extension of the longitudinal direction causes lifting of the four indicated and circular centering elements 26 by way of lifting elements (not visible in this illustration). The centering elements 26 fit into corresponding depressions of the support plate which centering elements effectively permit "sliding into" these fixings. The rear support plate suspension 24 and the front support plate suspension 27 can be seen as part of the mentioned lifting elements 26. The control member 20 is supported on a transverse link 25 which by way of lifting elements (not visible here) is connected to the two rear lifting-rod levers 23.

In this illustration, both servomotors for the two drive wheels can be seen from above, of which only the left servomotor is referenced with 21. The spring elements which guide both drive wheels, by way of deflection levers (not visible here) ensure that the drive wheels maintain secure floor contact even on a non-planar floor. Here too, only that spring element that in the driving direction is on the left side is referenced with 22.

Referenced with 28, in each case one left-side and one right-side installation space for energy storage units is illustrated. These here may be electric batteries or energy storage units for other liquid or gaseous forms of energy. A 3-D scanner 10 and a light-field sensor 15 are attached to the front side of the transport vehicle.

However, both types of sensors may also be additionally attached to both lateral faces and/or to the rear side of a transport vehicle.

In addition, a WLAN antenna 11 is installed on the front side. This can also be supplemented by a further WLAN antenna 11 on the rear side of the transport vehicle.

FIG. 6 shows a detailed illustration of the kinematics of the transport vehicle. This depiction illustrates the transport vehicle without the encasing housing.

Reference to the connections to the housing will be made at a corresponding point. First, the kinematics of the drive wheels will be set forth.

The left-side drive wheel, referenced with 47 here, known from FIG. 4 and the associated rotation axle (drawn on the right thereof and not referenced in more detail), which is fastened to the housing of the transport vehicle (likewise not referenced here in more detail), can be seen in the foreground. The axle bearing 29 for the left-side drive wheel 47, having the servomotor 21 thereof serving as the drive for the drive wheel 47 and lying thereabove, are connected by way of an angular plate (not referenced in more detail and only visible from the rear) so as to form a functional unit. A gear belt by way of which the servomotor 21 drives the rotation axle of the left-side drive wheel 47 runs in this angular plate.

The corresponding servomotor 38 for the right-side drive can be seen on the opposite side. The corresponding angular plate on this side can be seen from the other side in the illustration shown. The corresponding gear belt 36 running in this angular plate is identified here. The entire functional unit composed of the drive wheel 47 having the axle bearing 29, the servomotor 21, and the angular plate having the gear belt thereof, by way of an angular lever 45 is pivotable about the rotation axle already mentioned above. By way of an articulation 44, the angular lever is articulated on a U-shaped transverse link 25 which runs across almost the entire width of the transport vehicle and to the other end of which the right-side drive wheel is fastened in a corresponding manner. Furthermore, a spring element 22, the other mounting point of which is fastened to the housing of the transport vehicle, is mounted on the articulation 44. On the left side of the transport vehicle that is visible in FIG. 6, this articulation point is shown as a block-shaped mounting which is drawn so as to be hardly visible above the drive wheel 47.

By contrast, this point on the opposite side is referenced as the articulation point 37 of the corresponding right spring element. The spring element 22 serves the purpose of pushing the drive wheel 47 onto the floor area by way of the angular lever 45 and to thus improve contact of the drive wheel 47 with the floor. This applies in a corresponding manner to the right drive wheel lying opposite.

A further kinematics installation for lifting a storage shelf 1 will be set forth hereunder.

In order for a storage shelf 12 to be able to be picked up, it is necessary for the transport vehicle to lift the storage shelf 12 after having driven therebelow and to release floor contact of said storage shelf, so as to be able to transport the latter.

The front lifting rods 35 and the rear lifting rods 41 by way of direct contact serve this purpose.

The lifting rods 35 and 41 are lifted and lowered by means of a control member 20 which in turn generates the forces required therefor in the form of a threaded spindle and by way of a retractable and deployable cylinder by way of a swivel head 34 and an articulated lift-and-rotate lever 33.

It can clearly be seen from the left side in FIG. 6 how the lift-and-rotate lever 33 in interaction with in each case one front push-rod lever 32 by means of corresponding rotation movements about a rotation axle 31, which is connected to the housing of the transport vehicle, causes the necessary lifting or lowering of the two front lifting rods 35.

The front lifting rods 35 support in each case the corresponding front support plate suspension 27.

At the same time, it can be derived from this region of FIG. 6 that a push rod 30 which by way of an axle lever 43 transmits the movements of the lift-and-rotate lever 33 to in each case one rear lifting-rod lever 23 is articulated on the lift-and-rotate lever 33. The movements of the rear lifting-rod lever 23 lead to the necessary lifting or lowering of the two rear lifting rods 41. The rear lifting rods 41 in each case support the corresponding rear support plate suspension 24. The front support plate suspension is referenced with 27.

The movement of the control member 20 or of the threaded spindle thereof, respectively, is performed by way of a drive 39 and a power transmission 40 which diverts force. The power transmission 40 is fastened to the transverse link 25 by means of a fork head 48. Since the fork head 48 is rotatably mounted on the transverse link 25, the transverse link 25 as a connection element between the angular lever 45 and the counterpart thereof lying opposite may move, enabling in this way that the two drive wheels may execute mutually independent vertical pivoting movements. The front lifting rods 35 and the rear lifting rods 41 in each case still have additional control members 49 for the front lifting rods 35 and additional control members 42 for the rear lifting rods 41, which control members, prior to the actual procedure of lifting the transported goods commences, lift the entire support plate out of a respective latching position which serves for securing the load during the driving mode. In an exemplary manner, the control members 42 are referenced for the rear lifting rods 41. Actuation of the mentioned control members may be performed separately and independently of the above described lifting of the transported goods.

Overall, on account of the demonstrated assembly of the lifting rods 35 and 41, the interdisposed lever assembly, and the control member 20 in interaction with the transverse link 25, and the action thereof on the angular lever 45 and the counterpart thereof, it is achieved that the center of gravity of the load of the storage shelf lies directly in the region of the drive wheels.

In order for the inclination of the transport vehicle and of the transported goods to be detected, a particular sensor is used, the latter however not being specifically referenced.

Since the transport vehicle enables transportation of transported goods across inclined planes, expensive elevator systems which in terms of control technology are complex may be dispensed with in many cases.

In one particular design embodiment it may be provided that the center of gravity of the storage shelf 1 is detected by means of sensors and the result of such center-of-gravity determination is used for controlling the control members of the lifting rods 35 and 41.

Furthermore, it may be provided in one particular design embodiment that sensors for detecting the rotation movement of the drive wheels 47 are provided, which sensors may also determine slippage on each drive wheel 5 dependent on the speed of the transport vehicle. Such a sensor 46 is illustrated in FIG. 6 for detecting the rotation movement of the left-side drive wheel 47.

Furthermore, it may be provided that the inclination of a storage shelf 1 is determined by means of an inclination sensor.

FIG. 7 shows an illustration of the hotspot functions of transport vehicles. Here, a plurality of transport vehicles 16 having the 3-D scanners 10 thereof, and the light-field sensors 15 thereof, and the WLAN antennae 11 thereof are illustrated amidst an arrangement of electromagnetic barriers.

Since numerous installations having dissimilar inner workings are often to be encountered especially in large factory buildings, the risk of interference of radio traffic between a command center and numerous transport vehicles is very high.

In order for an interference-free radio connection between a command center and/or individual transport vehicles to be guaranteed in such conditions in every travel situation of the transport vehicles, it is proposed in the present application for every transport vehicle to be configured as a mobile WLAN hotspot and to thus circumvent any shadowing of radio waves.

Vehicle control here is conceived such that each vehicle may determine whether data exchange has taken place between the vehicle and the command center. This may be determined by a feedback signal from the command center to the vehicle, or vice-versa, for example. If the data connection is interrupted, the respective vehicle sends out a message which may be detected by other vehicles. As soon as another vehicle has received that message, data exchange between this vehicle and the vehicle that has lost the connection to the command center is re-established. The respective vehicle which is henceforth connected to the command center then serves as a mobile WLAN hotspot, also referred to as MIFI. In this manner, this vehicle serves as a data connection between the vehicle subject to shadowing and the command center for as long as it takes for a direct data connection to be able to be re-established.

A known method is preferably employed in order for the described transport vehicles to be controlled, said method having been developed by the Technical University of Berlin and having been published on Oct. 10, 2007 under:

Dynamic Routing of Automated Guided Vehicles in Real Time
(Ewgenij Gawrilow, Ekkehard Köhler, Rolf H. Möhring, Björn Stenzel).

This here is substantially a two-part algorithm of which the first part comprises a preparation step and of which the second part computes a route in real time and here provides a specific time window for each section.

The application of the method described here related to an AGV network in the Altenwerder container terminal in the Port of Hamburg. However, the application of the same method for operating automated guided vehicles without interference in a warehouse does appear to be novel.

Controlling the complex movement procedures and signal processing of the sensors used requires a special control program.

LIST OF REFERENCE SIGNS

1 Support plate, lifting plate
2 Display
3 Housing, vehicle housing
4 Operating element, emergency stop
5 Rotation axle
6 Drive wheel
7 Coating of a drive wheel
8 Charge coupling for electric charging
9 Front support wheel
10 3-D scanner (collision prevention)
11 WLAN antenna (mobile hot-spot)
12 Storage shelf
13 Transported goods
14 Inductive pickup element for electrical energy
15 Light-field sensor
16 Transport vehicle
17 Electromagnetic barriers
18 Shelf unit post
19 Person
20 Control member, threaded spindle
21 Servomotor for left-side drive wheel
22 Spring element
23 Rear lifting-rod lever
24 Rear support plate suspension
25 Transverse link
26 Centering element
27 Front support plate suspension
28 Installation space for energy storage unit
29 Axle bearing for the left-side drive wheel
30 Push rod
31 Rotation axle for a front push-rod lever
32 Front push-rod lever
33 Lift-and-rotate lever
34 Swivel head
35 Front lifting rod
36 Gear belt for right-side drive
37 Articulation point of right spring element on the housing 3
38 Servomotor for right-side drive
39 Drive for control member 20
40 Power transmission from the drive 39 to the control member 20
41 Rear lifting rod
42 Control member for a rear lifting rod
43 Axle lever
44 Articulation for an angular lever 40
45 Angular lever
46 Sensor for detecting the rotation movement of the left-side drive wheel
47 Left-side drive wheel
48 Fork head
49 Control member for a front lifting rod

The invention claimed is:

1. A transport vehicle for transporting storage shelves by partially autonomous operation and without interference in factory buildings having deadspots, the transport vehicle comprising:
   a) a vehicle housing (3) having a support plate (1) adapted for receiving and transporting a storage shelf (12) having transported goods (13), having two separately driven drive wheels (6) on both sides of one in each case individually mounted rotation axle (5) in a center region of the vehicle housing (3), wherein in each case at least one support wheel (9) is provided on a front side and on a rear side of the vehicle housing,
   b) a transverse link (25) which connects the drive wheels (6) which are in each case by way of an angular lever (46) pivotable about the rotation axle (5) such that said drive wheels (6) are configured to execute mutually independent vertical movements,
   c) a control member (20) that is longitudinally-oriented in the vehicle housing that is centrally disposed with respect to the separately driven drive wheels, wherein by way of a lift-and-rotate lever (33) and by way of a push rod (30) connected to the lift-and-rotate lever (33), the control member moves two front lifting rods (35) and two rear lifting rods (41) for lifting or lowering the support plate (1),
   d) a system for supplying energy to the transport vehicle either by way of inductive lines installed in the floor, by means of an inductive pickup element (14) or by way of energy supply stations which are for feeding electrical, liquid, or gaseous energy and are accessible when stationary, wherein installation space (28) for corresponding energy storage units is provided in the vehicle housing (3),
   e) at least one 3-D scanner (10), at least one light-field sensor (15), and at least one WLAN antenna (11) in the front region of the transport vehicle.

2. The transport vehicle as claimed in claim 1, wherein at least one 3-D scanner (10) and at least one light-field sensor (15) are provided on each side of the transport vehicle, wherein a further WLAN antenna is installed in the rear region of the transport vehicle.

3. The transport vehicle as claimed in claim 1 wherein for separate height adjustment the front lifting rods (35) in each case have one control member (49), and the rear lifting rods (41) in each case have one control member (42).

4. The transport vehicle as claimed in claim 1, wherein sensors (46) for detecting the rotation movement of the drive wheels (6) are provided, wherein the sensors are adapted to determine slippage on each drive wheel (6) dependent on the speed of the transport vehicle.

5. A method for operating a transport vehicle for transporting storage shelves by partially autonomous operation and without interference in factory buildings having deadspots, the method comprising:
   a) providing a command center adapted to receive an order for transportable goods, a storage shelf (12) having transportable goods (13), and a plurality of transport vehicles according to claim 1;
   b) a command center in a warehouse region having deadspots receives the order to ensure that a specific storage shelf (12) having transported goods (13) located thereon is to be transported to a specific destination;

c) the command center identifies a selected transport vehicle from the plurality of transport vehicles;

d) the selected transport vehicle then receives from the command center the order to seek a specific storage shelf (12) in a specific area of a floor space of a warehouse region, to pick up the storage shelf (12), and to drive the storage shelf (12) having the transported goods (13) located thereon to a specific storage space, wherein one or more further transport vehicles are included by means of a WLAN antenna and a corresponding transmission and reception device for the corresponding communication to circumvent deadspots;

e) the selected transport vehicle receives from the command center the instructions, which have been determined by means of a specific route algorithm, in terms of the route to be driven and of the speed to be driven in each section of the journey in order for the immediate destination region to be reached in a specific time window;

f) the selected transport vehicle by means of the 3-D scanner (10) and of the light-field sensor (15) determines the storage shelf (12) to be picked up, selects a suitable initial position for picking up the storage shelf (12), drives under the latter and lifts up the latter for transport;

g) the selected transport vehicle awaits the instructions from the command center and, according to the received instructions, starts off on the return journey.

6. The method as claimed in claim 5, wherein a loss of data connection between the selected transport vehicle and the command center is registered by other transport vehicles, and one of the other transport vehicles as a mobile WLAN hotspot re-establishes the lost data connection to the command center.

7. The method as claimed in claim 5, wherein the center of gravity of the storage shelf (12) is detected by means of sensors, and the result of such center-of-gravity determination is used for controlling the control members of the lifting rods (35) and (41), and in that the inclination of a storage shelf (12) is determined by means of an inclination sensor.

8. The method as claimed in claim 5, wherein sensors for detecting the rotation movement of the drive wheels (6) are provided, wherein the sensors are adapted to determine slippage on each drive wheel (6) dependent on the speed of the transport vehicle.

\* \* \* \* \*